(12) United States Patent
Yang et al.

(10) Patent No.: US 10,920,029 B2
(45) Date of Patent: *Feb. 16, 2021

(54) POLYETHYLENE AND CYCLIC OLEFIN COPOLYMER BLEND COMPOSITIONS WITH OXYGEN BARRIER PROPERTIES AND ARTICLES MADE THEREFROM

(71) Applicant: ExxonMobil Chemical Patents Inc., Baytown, TX (US)

(72) Inventors: Yong Yang, Kingwood, TX (US); Kimari T. M. Slaughter, Baytown, TX (US); Hillary L. Passino, Houston, TX (US); Bethany M. Welke, Seabrook, TX (US); Lynette E. Home-Campbell, Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/250,756

(22) Filed: Jan. 17, 2019

(65) Prior Publication Data

US 2019/0263985 A1 Aug. 29, 2019

Related U.S. Application Data

(60) Provisional application No. 62/636,215, filed on Feb. 28, 2018.

(51) Int. Cl.
| | | |
|---|---|---|
| *C08L 23/06* | (2006.01) | |
| *C08J 5/22* | (2006.01) | |
| *B65D 85/72* | (2006.01) | |
| *C08L 45/00* | (2006.01) | |
| *B65D 75/00* | (2006.01) | |
| *C08L 23/04* | (2006.01) | |
| *C08L 23/08* | (2006.01) | |

(52) U.S. Cl.
CPC .......... *C08J 5/2231* (2013.01); *B65D 75/008* (2013.01); *B65D 85/72* (2013.01); *C08L 23/04* (2013.01); *C08L 23/06* (2013.01); *C08L 23/0823* (2013.01); *C08L 45/00* (2013.01); *C08J 2323/06* (2013.01); *C08L 2203/162* (2013.01)

(58) Field of Classification Search
CPC .......... C08L 23/06; C08L 45/00; C08L 23/04; C08L 23/08; C08L 23/10; C08L 2203/16; C08L 2203/0162; C08J 5/18; C08J 5/2231; C08J 123/00; C08J 2445/00; C08J 2323/00; C08J 2323/08; B32B 27/00

See application file for complete search history.

(56) References Cited

U.S. PATENT DOCUMENTS

| | | | |
|---|---|---|---|
| 3,380,646 A | 4/1968 | Doyen et al. | 229/57 |
| 3,984,610 A | 10/1976 | Elston | 526/169 |
| 5,498,677 A | 3/1996 | Weller et al. | 526/133 |
| 5,552,504 A | 9/1996 | Bennett et al. | 526/348.1 |
| 5,602,219 A | 2/1997 | Aulbach et al. | 526/160 |
| 5,621,054 A | 4/1997 | Harrington | 526/126 |
| 6,180,123 B1 | 1/2001 | Mondet | 424/401 |
| 6,384,162 B1 | 5/2002 | Zahalka et al. | 526/136 |
| 6,458,919 B1 | 10/2002 | Osan et al. | 528/480 |
| 9,982,081 B2* | 5/2018 | Yang et al. | C08L 45/00 |
| 2010/0105851 A1 | 4/2010 | Van Doremaele et al. | 526/170 |
| 2011/0021731 A1 | 1/2011 | Hirata et al. | 526/281 |
| 2011/0256373 A1 | 10/2011 | Tatarka et al. | 428/218 |
| 2012/0258326 A1 | 10/2012 | Pham et al. | 428/518 |
| 2014/0134430 A1 | 5/2014 | Mitchell et al. | 428/354 |
| 2014/0162041 A1 | 6/2014 | Jester et al. | 428/220 |
| 2016/0016884 A1 | 1/2016 | Yoshitomo et al. | C07C 69/738 |
| 2016/0136884 A1* | 5/2016 | Kneale | B29C 67/0051 428/201 |
| 2017/0233516 A1 | 8/2017 | Yang et al. | C08F 232/08 |

FOREIGN PATENT DOCUMENTS

| | | | | |
|---|---|---|---|---|
| EP | 0198843 | 4/1995 | | B32B 27/08 |
| JP | 2003-313247 | 11/2003 | | C08F 210/00 |
| KR | 2004-0065110 | 7/2004 | | C08F 210/00 |

OTHER PUBLICATIONS

Dai, D. et al. (2011) "Characterization of structure and properties of metallocene-catalyzed cycloolefin copolymer and development of fiber therefrom," *Hecheng Xianwei Gongye*, v. 34(4), pp. 34-36.
Rwei, S-P et al. (2012) "Investigation on the spinnability of metallocene cyclic olefins copolymer melt," *Textile Research Jrnl.*, v.82(4) pp. 315-323.

(Continued)

*Primary Examiner* — Nathan M Nutter
(74) *Attorney, Agent, or Firm* — ExxonMobil Chemical Patents Inc.—Law Department

(57) ABSTRACT

In an embodiment, a monolayer, sealable film includes polyethylene; and between about 0.2 wt % and about 10 wt % of a branched cyclic olefin copolymer (bCOC) comprising: between about 50 wt % to about 98 wt % ethylene; and between about 2 wt % and about 50 wt % cyclic olefin derived monomer units. In another embodiment, a receptacle for containing organic material (such as food), gas, and/or fluent material includes a storage zone; a sealing zone extending around at least a portion of the storage zone; and a film structure having an exterior surface and a storage side surface facing the storage zone, wherein the film structure comprises a gas barrier film, comprising: polyethylene; and between about 0.2 wt % and about 10 wt % of a branched cyclic olefin copolymer (bCOC) comprising: between about 50 wt % and about 98 wt % ethylene; and between about 2 wt % and about 50 wt % cyclic olefin derived monomer units.

48 Claims, 1 Drawing Sheet

(56) References Cited

OTHER PUBLICATIONS

Thorshuag, K. et al. (2002) "Poly(ethylene-co-norbornene) obtained with a constrained geometry catalyst. A study of reaction kinetics and copolymer properties," *Macromolecules*, v.35, pp. 2903-2911.

* cited by examiner

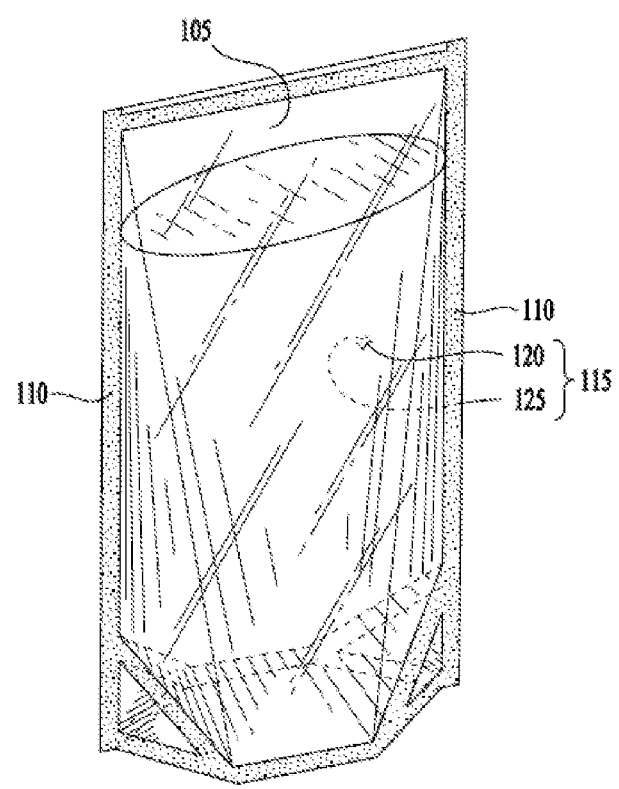

POLYETHYLENE AND CYCLIC OLEFIN COPOLYMER BLEND COMPOSITIONS WITH OXYGEN BARRIER PROPERTIES AND ARTICLES MADE THEREFROM

CROSS REFERENCE TO RELATED APPLICATIONS

This application claims priority to and the benefit of U.S. Ser. No. 62/636,215, filed Feb. 28, 2018, which is incorporated herein by reference in its entirety.

FIELD

The present disclosure provides compositions of polyethylene and cyclic olefin copolymers (COC) and articles, such as films, made therefrom.

BACKGROUND

Cyclic olefin copolymer(s) ("COC(s)") can be broadly defined as polyolefins with cyclic olefin comonomers. Conventionally, and more specifically, COCs may refer to ethylene-norbornene copolymers. Most of the commercial COCs are amorphous and linear, with 40 mol % or more norbornene-derived comonomer unit concentrations. Typically, COCs have high use-temperatures which make them ideal in optical applications, and applications requiring high stiffness and strength, as well as excellent moisture barrier and polar chemical resistance. However, traditional COCs suffer from poor toughness, insufficient oxygen barrier abilities, oil resistance, and difficulty in processing the neat resins. In particular, the poor miscibility of amorphous COCs with most of the polyolefins, which are typically semi-crystalline, also limits the broader applications and value proposition in blends and composites.

Polyethylenes (PEs) and COCs typically have good moisture barrier properties due to their non-polar hydrocarbon nature. For oxygen barrier properties, there are correlations between the chemical structures and morphological properties, such as density, crystallinity and orientation. For some applications, e.g. food packaging, both moisture and oxygen barrier properties are needed. To achieve sufficient oxygen barrier properties, barrier layers of expensive materials (such as ethylene vinyl alcohol (EVOH), polyamides, and polyvinylidene chloride (PVDC)), and in some cases tie layers are needed. Blend films of PE and COC, if the components don't have good miscibility or form poor morphologies, will result in oxygen permeability higher than that of each individual component, presumably due to the defects or voids in the interfaces.

There remains a need, however, for blend films of PE and COC having good miscibility, morphology, and oxygen barrier properties. Furthermore, there remains a need for blend films of PE and COC without using expensive barrier layers. Furthermore, there remains a need to use such blend films in articles of use such as food-packaging, gas-encapsulating pillow pouches, and monolayer heat seals. The present disclosure meets this and other needs.

Disclosures of potential interest include; U.S. Pat. Nos. 3,380,646; 3,984,610; 5,498,677; 5,552,504; 5,621,054; 6,180,123; 6,384,162; 6,458,919; U.S. Patent Publication Nos. 2017/233516; 2010/105851; 2011/021731; 2011/256373; 2012/258326; 2014/162041; JP 2003/313247; and KR 2004/0065110. S.-P. Rwei et al., "Investigation on the spinnability of metallocene cyclic olefins copolymer melt," in 82(4) TEXTILE RESEARCH J. 315-323 (2012); D. Dai et al., "Characterization of structure and properties of metallocene-catalyzed cycloolefin copolymer and development of fiber therefrom," in 34(4) HECHENG XIANWEI GONGYE 34-36 (2011); and K. Thorshuag et al., "Poly(ethylene-co-norbornene) obtained with a constrained geometry catalyst. A study of reaction kinetics and copolymer properties," in 35 MACROMOLECULES 2903-2911 (2002).

SUMMARY

In an embodiment, a monolayer, sealable film is provided. The monolayer, sealable film includes polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.

In another embodiment, a receptacle for containing organic material, such as food, is provided. The receptacle for containing organic material includes a storage zone; a sealing zone extending around at least a portion of the storage zone; and a film structure having an exterior surface and a storage side surface facing the storage zone, wherein the film structure comprises a gas barrier film comprising: polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.

In another embodiment, a receptacle for containing gas is provided. The receptacle for containing gas includes a storage zone; a sealing zone extending around at least a portion of the storage zone; and a film structure having an exterior surface and a storage side surface facing the storage zone, wherein the film structure comprises a gas barrier film, comprising: polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.

In another embodiment, a receptacle for containing a fluent material is provided. The receptacle for containing a fluent material includes a storage zone; a sealing zone extending around at least a portion of the storage zone; and a film structure having an exterior surface and a storage side surface facing the storage zone, wherein the film structure comprises a gas barrier film, comprising: polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

The FIGURE is a perspective view of the receptacle according to some embodiments.

DETAILED DESCRIPTION

The present disclosure solves problems in prior art COCs by providing semi-crystalline elastomeric COCs with long-chain branching ("LCB"). The synergy of semi-crystallinity and LCB characteristics enables better miscibility with polyethylenes, improves processability, and enhances oxygen barrier and oil resistance properties, in addition to maintaining the beneficial properties that traditional COCs possess (e.g., high purity, high moisture barrier, good polar chemical resistance). Moreover, the present disclosure solves problems in the prior by achieving sufficient moisture and oxygen barrier properties for films without the need for barrier layers of expensive materials (such as ethylene vinyl alcohol (EVOH), polyamides, and polyvinylidene chloride (PVDC)) and/or tie layers. The present disclosure provides for films that can be used to contain, receive, and dispense such things as fluent products, food items, and gases.

For purposes of this disclosure, and unless otherwise specified, "Group 4" refers to the new notation of the Periodic Table of the Elements as published in HAWLEY'S CONDENSED CHEMICAL DICTIONARY, 13th Edition (John Wiley & Sons, Inc. 1997).

For purposes of this disclosure, and unless otherwise specified, "combining" refers to the named components being brought together to make contact with one another, such as in a polymerization reactor, under such conditions of temperature, pressure, solvent, and other environmental conditions that effect a chemical reaction between one or more monomers that is typically catalyzed by the presence of a catalyst precursor and activator.

For purposes of this disclosure, and unless otherwise specified, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

For purposes of this disclosure, and unless otherwise specified, the terms "substituent," "radical," "group," and "moiety" may be used interchangeably.

For purposes of this disclosure, and unless otherwise specified, the term "$C_n$" means hydrocarbon(s) having n carbon atom(s) per molecule, wherein n is a positive integer.

For purposes of this disclosure, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

For purposes of this disclosure, and unless otherwise specified, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes of this disclosure, and unless otherwise specified, a "polymer" has two or more of the same or different monomer ("mer") units. A "homopolymer" is a polymer having mer units that are the same. A "copolymer" is a polymer having two or more mer units that are distinct or different from each other. A "terpolymer" is a polymer having three mer units that are distinct or different from each other. "Distinct" or "different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units.

For purposes of this disclosure, and unless otherwise specified, the term "continuous" means a system that operates without interruption or cessation. For example a continuous process to produce a polymer would be one where the reactants are continually introduced into one or more reactors and polymer product is continually withdrawn.

For purposes of this disclosure, and unless otherwise specified, a solution polymerization refers to a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems can be not turbid as described in J. Vladimir Oliveira, C. Dariva and J. C. Pinto, Ind. Eng. Chem. Res., 2000, Vol. 29, p. 4627.

For purposes of this disclosure, and unless otherwise specified, a bulk polymerization refers to a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than about 25 wt % of inert solvent or diluent, such as less than about 10 wt %, for example less than about 1 wt % or about 0 wt %.

For purposes of this disclosure, and unless otherwise specified, the term "slurry" process means a polymerization process where a supported catalyst is employed and monomers are polymerized on the supported catalyst particles. At least about 95 wt % of polymer products derived from the supported catalyst are in granular form as solid particles (not dissolved in the diluent).

For purposes of this disclosure, and unless otherwise specified, a "catalyst system" is the combination of at least two catalyst compounds, a support material, an optional activator, and an optional co-activator. For the purposes of this disclosure and the claims thereto, when catalyst systems are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety. The transition metal compound may be neutral as in a precatalyst, or a charged species with a counter ion as in an activated catalyst system.

For purposes of this disclosure, and unless otherwise specified, the terms "cocatalyst" and "activator" are used herein interchangeably and are defined to be any compound which can activate any one of the catalyst compounds herein by converting the neutral catalyst compound to a catalytically active catalyst compound cation.

For purposes of this disclosure, and unless otherwise specified, the term "contacting" is used herein to refer to materials which may be blended, mixed, slurried, dissolved, reacted, treated, or otherwise contacted in some other manner.

For purposes of this disclosure, and unless otherwise specified, the terms "hydrocarbyl radical," "hydrocarbyl,"

"hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and their substituted analogues. Substituted hydrocarbyl radicals are radicals in which at least one hydrogen atom of the hydrocarbyl radical has been substituted with at least one halogen (such as Br, Cl, F or I) or at least one functional group such as $C(O)R^*$, $C(O)NR^*_2$, $C(O)OR^*$, $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, and $PbR^*_3$ (where $R^*$ is independently a hydrogen or hydrocarbyl radical, and two or more $R^*$ may join together to form a substituted or unsubstituted saturated, partially unsaturated or aromatic cyclic or polycyclic ring structure), or where at least one heteroatom has been inserted within a hydrocarbyl ring.

For purposes of this disclosure, and unless otherwise specified, the term "aryl" or "aryl group" includes a $C_4$-$C_{20}$ aromatic ring, such as a six carbon aromatic ring, and the substituted variants thereof, including phenyl, 2-methyl-phenyl, xylyl, 4-bromo-xylyl. Likewise heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

For purposes of this disclosure, and unless otherwise specified, where isomers of a named alkyl or aryl group exist (e.g., n-butyl, iso-butyl, iso-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl or aryl group without specifying a particular isomer (e.g., butyl) expressly discloses all isomers (e.g., n-butyl, iso-butyl, sec-butyl, and tert-butyl).

For purposes of this disclosure, and unless otherwise specified, for any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, diastereomers, and other optical isomers whether in enantiomeric or racemic forms, as well as mixtures of stereoisomers, as would be recognized by a skilled artisan.

For purposes of this disclosure, and unless otherwise specified, the term "ring atom" means an atom that is part of a cyclic ring structure. By this definition, a benzyl group has six ring atoms and tetrahydrofuran has 5 ring atoms.

For purposes of this disclosure, and unless otherwise specified, a heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

For purposes of this disclosure, and unless otherwise specified, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

For purposes of this disclosure, and unless otherwise specified, a "receptacle" refers to an article of manufacture which can be in the form of a monolayer film, multilayer film, monolayer sheet, multilayer sheet, containers (e.g., bags, shrink bags, pouches, casings, trays, lidded trays, overwrapped trays, form shrink packages, vacuum skin packages, flow wrap packages, thermoformed packages, packaging inserts, heat seals, or combinations thereof). A receptacle may include rigid, semi-rigid, and flexible materials. A receptacle may be heat shrinkable not, or oriented or non-oriented. A receptacle can be used to contain, receive, and dispense such things as fluent products, food items, and gases.

For purposes of this disclosure, and unless otherwise specified, a "fluent material" includes liquid products and pourable solid products.

For purposes of this disclosure, and unless otherwise specified, a "sealable film" and "heat seal" refer to a film structure involved in heat sealing the film to itself, another film layer of the same or another film, and/or another article which is not a film. Heat sealing can be performed in any method known to those skilled in the art, including thermal sealing, hot air sealing, impulse sealing, melt bead sealing, ultrasonic sealing, hot wire sealing, infrared radiation sealing, ultraviolet radiation sealing, electron beam sealing.

Branched Cyclic Olefin Copolymer (bCOC)
Forming bCOC

Generally, a branched cyclic olefin copolymer (bCOC) can be formed by combining a catalyst precursor and an activator at a temperature within a range from about 60° C., or about 70° C., or about 80° C. to about 110° C., or about 120° C., or about 130° C., or about 140° C. (e.g., the reactor temperature with all catalyst and monomer components combined with one another) with a feed comprising (or consisting essentially of, or consisting of) ethylene and at least one cyclic olefin; where the catalyst precursor is selected from the group consisting of $C_s$-symmetric Group 4 metallocenes comprising any two ligands selected from cyclopentadienyl and ligands isolobal to the cyclopentadienyl group, such as a $C_s$-symmetric ansametallocene.

The ligands of the $C_s$-symmetric Group 4 metallocenes that are isolobal to the cyclopentadienyl group may be selected from indenyl, benzindenyl, fluorenyl, octahydrofluorenyl, cyclooctatetraenyl, cyclopentaphenanthrenyl, hydrogenated or partially hydrogenated versions thereof, substituted versions thereof, and heterocyclic versions (for example, one or two substitutions of ring carbons for nitrogen, oxygen, sulfur, silicon, and/or phosphorous) thereof.

At least one of the two ligands may be mono- or di-substituted with groups selected from $C_1$ to $C_{12}$ alkyls, $C_3$ to $C_{16}$ iso-alkyls, $C_6$ to $C_{24}$ aryls, $C_9$ to $C_{24}$ fused multi-ring aryls, $C_5$ to $C_{20}$ nitrogen and/or sulfur heterocycles, and combinations thereof. For example, at least one of the two ligands is mono- or di-substituted with groups selected from iso-propyl, iso-butyl, tert-butyl, phenyl, alkylphenyl, and dialkylphenyl. Also, in any embodiment, the bridging group that covalently links the any two ligands described herein comprises at least one phenyl group, alkyl substituted phenyl group, or silyl substituted phenyl group.

The catalyst precursor may be selected from the following structures (Ia), (Ib), and (Ic):

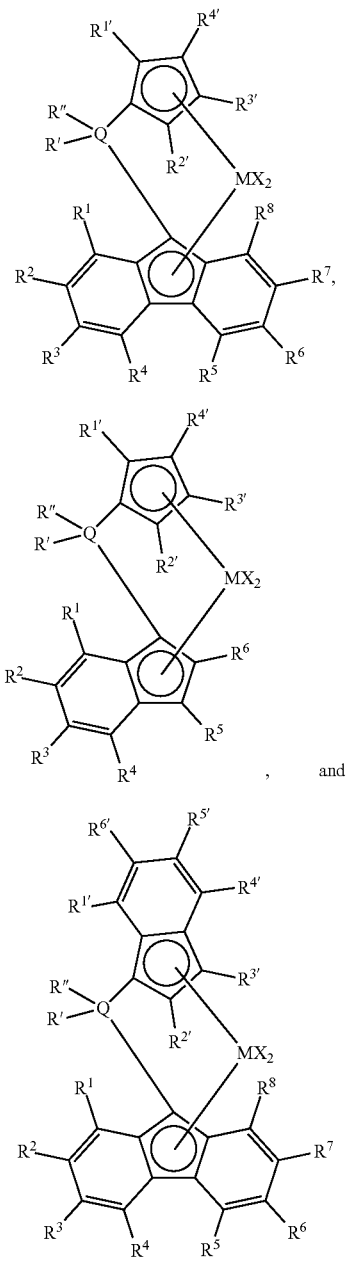

wherein M is a Group 4 metal, such as zirconium or hafnium; Q is silicon or carbon; each of R' and R" are independently selected from phenyl, alkyl substituted phenyl, and silyl substituted phenyl (for example, phenyl-p-tri-($C_1$ to $C_6$)-silyl groups); each X is independently selected from $C_1$ to $C_{10}$ alkyls, phenyls, and halogens; each of $R^1$, $R^2$, $R^3$, $R^4$, $R^5$, $R^6$, $R^7$, and $R^8$ is independently selected from hydrogen, $C_1$ to $C_{10}$ alkyls, phenyls, and alkylphenyls; and each of $R^{1'}$, $R^{2'}$, $R^{3'}$, $R^{4'}$, $R^{5'}$, and $R^{6'}$ is independently selected from hydrogen, $C_1$ to $C_{10}$ alkyls, and phenyls.

M in any of the structures above may be hafnium, and each of R' and R" are phenyl-p-tri-($C_1$ to $C_6$)-silyl groups. The catalyst precursor is combined with at least one activator to effect polymerization of the cyclic olefin monomers and ethylene, wherein the activator may comprise a non-coordinating borate anion and a bulky organic cation. The non-coordinating borate anion may comprise a tetra(perfluorinated $C_6$ to $C_{14}$ aryl)borate anion and substituted versions thereof, such as tetra(pentafluorophenyl)borate anion or tetra(perfluoronaphthyl) borate anion. The bulky organic cation may be selected from the following Formulas (IIa) and (IIb):

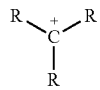

(IIa)

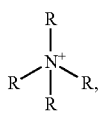

(IIb)

wherein each R group is independently hydrogen, a $C_6$ to $C_{14}$ aryl (e.g., phenyl, naphthyl), a $C_1$ to $C_{10}$ or $C_{20}$ alkyl, or substituted versions thereof.

The bulky organic cation may be a reducible Lewis Acid, such as a trityl-type cation (wherein each "R" group in (IIa) is aryl) capable of extracting a ligand from the catalyst precursor, where each "R" group is an $C_6$ to $C_{14}$ aryl group (e.g., phenyl, naphthyl) or substituted $C_6$ to $C_{14}$ aryl, for example, triphenyl carbenium and substituted versions thereof.

The bulky organic cation may be a Brønsted acid capable of donating a proton to the catalyst precursor, wherein at least one "R" group in (IIb) is hydrogen. Exemplary bulky organic cations of this type in general include ammoniums, oxoniums, phosphoniums, silyliums, and mixtures thereof, such as: ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether, diethyl ether, tetrahydrofuran, and dioxane; and sulfoniums from thioethers, such as diethyl thioethers and tetrahydrothiophene, and mixtures thereof.

The catalyst precursor reacts with the activator to form a "catalyst" or "activated catalyst" that can then polymerize the monomers. The catalyst may be formed before combining with monomers, after combining with monomers, or simultaneously therewith.

The cyclic olefin monomer that is combined with ethylene monomers in the polymerization process may be selected from $C_5$ to $C_8$, or $C_{10}$, or $C_{12}$, or $C_{16}$, or $C_{20}$ olefins comprising at least one $C_5$ to $C_8$ cyclic structure, such as, for example, bicyclic olefins which are cyclic olefins containing a bridging hydrocarbon moiety that forms two rings in the overall structure such as in bicyclo-(2,3,1)heptene-2 (norbornenes), or tetracyclodocedene, or substituted versions thereof.

In some embodiments, the components are combined at a pressure of at least about 0.8 MPa, or about 1 MPa, or about 2 MPa, or about 3 MPa; or within a range from about 0.8 MPa, or about 1 MPa, or about 2 MPa, or about 3 MPa to about 4 MPa, or about 6 MPa, or about 8 MPa, or about 10 MPa. This pressure can come from the addition of the ethylene and/or other gases in the polymerization reactor, and is influenced by the temperature of the reactor. The level of ethylene and cyclic olefin is adjusted to obtain the desired catalytic activity as well as desired level of cyclic olefin comonomer incorporation into the bCOCs described herein.

More particularly, the various monomers and catalyst precursors and activators are combined in a polymerization reactor where they are allowed to react at the desired monomer concentrations, catalyst concentrations, temperatures, and pressures. The contacting takes place in a polymerization reactor having an inlet for the monomer and/or catalyst feeds, and an outlet for the effluent of the polymerization reaction, wherein the amount of bCOC in the effluent is within a range from about 2 wt %, or about 4 wt %, or about 6 wt % to about 12 wt %, or about 14 wt %, or about 16 wt %, or about 20 wt %, based on the weight of the components in the solvent of the effluent stream. The polymerization reaction may be any type of polymerization useful in forming polyolefins such as gas phase reactions, solution reactions, or slurry reactions, continuous solution reactions, or gas phase reactions.

The bCOC may be made in a "solution" process. For example, copolymerizations can be carried out in one or more single-phase, liquid-filled, stirred tank reactors with continuous flow of feeds to the system and continuous withdrawal of products under steady state conditions. When more than one reactor is used, the reactors may be operated in a serial or parallel configuration making essentially the same or different polymer components. Advantageously, the reactors may produce polymers with different properties, such as different molecular weights, or different monomer compositions, or different levels of long-chain branching, or any combinations thereof. All polymerizations can be performed in a system with a solvent comprising any one or more of $C_4$ to $C_{12}$ alkanes and/or the olefin monomers, using soluble metallocene catalysts or other single-site catalysts and discrete, non-coordinating borate anions as co-catalysts. A homogeneous dilute solution of tri-n-octyl aluminum in a suitable solvent may be used as a scavenger in concentrations appropriate to maintain reaction. Chain transfer agents, such as hydrogen, can be added to control molecular weight. Polymerizations can be at high temperatures described above and high conversions to maximize macromer reinsertions that create long chain branching, if so desired. This combination of a homogeneous, continuous, solution process helps to ensure that the polymer products have narrow composition and sequence distributions.

The polymerization can occur in two stages or two reactors to produce two bCOCs that are combined in situ or ex situ, each bCOC having any one or more properties that are distinct such as different weight average molecular weights, and/or different levels of short and/or long chain branching. As described above, when more than one reactor is used, the reactors may be operated in a series or parallel configuration making essentially the same or different polymer components.

The reactor(s) can be maintained at a pressure in excess of the vapor pressure of the reactant mixture to keep the reactants in the liquid phase. In this manner the reactors can be operated liquid-full in a homogeneous single phase. Ethylene and cyclic olefin feeds (as well as optional propylene, $C_4$ to $C_{12}$ α-olefins and/or dienes) can be combined into one stream and then mixed with a pre-chilled hexane stream. A solution of a tri-n-octyl aluminum scavenger in a desirable solvent may be added to the combined solvent and monomer stream just before it enters the reactor to further reduce the concentration of any catalyst poisons. A mixture of the catalyst components (catalyst precursor and/or activator) in solvent may be pumped separately to the reactor and entered through a separate port. Alternately, cooled isothermal reactors can be used that do not require feed chilling.

As mentioned above, optional dienes may be added to the polymerization medium, including "dual-polymerizable dienes" and "non-conjugated dienes". The "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.), such as non-conjugated vinyl norbornenes (e.g., 5-vinyl-2-norbornene) and $C_8$ to $C_{12}$ alpha-omega linear dienes (e.g., 1,7-heptadiene and 1,9-decadiene). The mole percent of the dual-polymerizable diene that is combined (i.e., present in the feed leading to the polymerization reactor) may be less than about 0.30 mol %, or about 0.28 mol %, or about 0.26 mol % relative to the other monomers, or within a range of about 0.05 mol % to about 0.26 mol %, or about 0.28 mol %, or about 0.30 mol %. The bCOC formed therefrom comprise "dual-polymerizable diene derived monomer units".

For purposes of this disclosure, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbomadiene, and other strained bicyclic and unconjugated dienes, and dicyclopentadiene. For example, the non-conjugated diene is selected from $C_7$ to $C_{30}$ cyclic non-conjugated dienes, such as 5-ethylidene-2-norbornene. The bCOC formed therefrom comprise "non-conjugated diene derived monomer units".

Dienes can be absent from the polymerization process, that is, they are not purposefully combined with the cyclic olefin, ethylene, and catalyst components in any stage of the process of forming the bCOCs described herein.

The reaction mixture may be stirred aggressively by any means known in the art to provide thorough mixing over a broad range of solution viscosities. Flow rates can be set to maintain an average residence time in the reactor of about 5 minutes to about 10 or about 20 minutes. On exiting the reactor the copolymer mixture may be subjected to quenching, a series of concentration operations, heat and vacuum stripping and pelletization, or alternately, may be fed to a subsequent reactor where another α-olefin such as propylene will be copolymerized, or fed to a line containing solution or slurry phase polyolefin (or a combination of both) where intimate mixing may occur. Water or a water/alcohol mixture is then supplied to quench the polymerization reaction, which might otherwise continue in the presence of surviving catalyst, unreacted monomer, and elevated temperature. Antioxidants can be also used to quench the polymerization reaction.

The bCOC can be recovered from the effluent of either the first polymerization step or the second polymerization step by separating the polymer from other constituents of the effluent using conventional separation means. For example, polymer can be recovered from either effluent by liquid-liquid separation or coagulation with a non-solvent, such as methanol, isopropyl alcohol, acetone, or n-butyl alcohol, or the polymer can be recovered by stripping the solvent and other media with heat or steam. After removal of solvent and monomer, pelletized polymer can be removed from the plant for physical blending with polyolefin. If in situ blends are preferred, the removal of solvent takes place after intimate mixing with the solution or slurry phase polyolefin.

The lean phase and volatiles removed downstream of the liquid phase separation can be recycled to be part of the polymerization feed. In the process, a degree of separation and purification takes place to remove polar impurities or internally unsaturated olefins that might undermine the activity of the catalyst. Otherwise any internally unsaturated olefins, which are difficult to polymerize would gradually build up in the lean phase and recycle streams. Adverse effects on the polymerization activity may be mitigated by removing these olefins from the recycle stream and/or encouraging their incorporation in the polymer, favored by high polymerization temperatures. Such methods are well known in the art.

The result of the polymerization reaction upon combining the components, in any embodiment, is the branched cyclic olefin copolymer (bCOC) useful for compositions, blends, films, and articles, and various end uses and blends described herein.

The molar mass of the bCOCs may be controlled by known means such as addition of hydrogen to the polymerization reactor when combining the monomers with the catalyst. The bCOCs disclosed herein have desirable crystalline or semi-crystalline properties that are reflected in measureable Differential Scanning calorimeter (DSC) parameters.

The bCOCs useful for embodiments described herein (such as compositions, blends, films, and articles, and various end uses) may have one or more of the following characteristics:

1) Within the range from about 99 wt % to about 75 wt %, or about 60 wt %, or about 50 wt % of ethylene derived monomer units, based on the total weight of the bCOC; and within the range from about 1 wt % to about 25 wt %, or about 40 wt %, or about 50 wt % of cyclic olefin derived monomer units, based on the total weight of the bCOC. For example, the cyclic olefin derived monomer units are present to within a range from about 1 mol %, or about 2 mol %, or about 3 mol % to about 8 mol %, or about 10 mol %, or about 12 mol %, or about 16 mol %.

2) Cyclic olefin-derived units that are the reaction product of $C_5$ to $C_8$, or $C_{12}$, or $C_{16}$, or $C_{20}$ cyclic olefins comprising at least one $C_5$ to $C_8$ cyclic structure, and those cyclic olefins such as those described above that are combined with the ethylene and catalyst components.

3) A number average molecular weight (Mn) of the bCOCs described herein is within a range from about 20 kg/mole, or about 30 kg/mole to about 60 kg/mole, or about 80 kg/mole, or about 100 kg/mole, or about 140 kg/mole.

4) A weight average molecular weight (Mw) of the bCOC is within a range from about 60 kg/mole, or about 70 kg/mole, or about 80 kg/mole to about 120 kg/mole, or about 140 kg/mole, or about 160 kg/mole, or about 200 kg/mole, or about 300 kg/mole.

5) A z-average molecular weight (Mz) is within a range from about 100 kg/mole, or about 120 kg/mole, or about 140 kg/mole to about 200 kg/mole, or about 250 kg/mole, or about 300 kg/mole, or about 350 kg/mole.

6) A Mz/Mw of greater than about 2.2, or about 2.4, or about 2.6, or within a range from about 2.2, or about 2.4, or about 2.6 to about 3.0, or about 3.2, or about 3.4.

7) A melting point temperature ($T_m$) within the range from about 40° C., or about 50° C., or about 60° C., or about 70° C., or about 85° C., or about 90° C. to about 95° C., or about 105° C., or about 110° C., or about 120° C.

8) One or more glass-transition temperatures ($T_g$), the largest (highest amplitude on y-axis of DSC trace) of which has a $T_g$ that is within the range from about −20° C., or about −15° C., or about −10° C. to about 10° C., or about 105° C., or about 20° C.

9) A percent crystallinity within a range from about 20%, or about 22%, or about 24%, or about 25%, or about 26% to about 30%, or about 32%, or about 34%, or about 36%, or about 38%.

10) A permanent set within the range from about 20%, or about 24%, or about 26% to about 30%, or about 32%, or about 34%, or about 35%. Levels of elasticity of the bCOC are reflected by a bCOCs permanent set properties.

The bCOCs useful for embodiments described herein, such as compositions, blends, films (average thickness of less than about 200 μm), and articles, and various end uses. The bCOC may be used alone as the primary polymeric component or in combination with other polymers such as propylene-based impact copolymers, ethylene-propylene-diene rubber (EPDM), high density polyethylene (HDPE), linear low density polyethylene (LLDPE), polypropylene, polystyrene, butyl-based polymers, aryl polyester carbonates, polyethylene terephthalate, polybutylene terephthalate, amorphous polyacrylate, nylon-6, nylon-6,6, further polyamides, polyaramids, polyether ketones, polyoxymethylene, polyoxyethylene, polyurethanes, polyether sulfones, and polyvinylidene fluoride. The bCOC is a modifier of such polymers, present at a level within a range from about 0.2 wt % to about 10 wt %, such as about 0.5 wt % to about 9 wt %, about 1 wt % to about 7 wt %, or about 2 wt % to about 5 wt %.

In some embodiments, the bCOC is used in compositions with polyethylene, as the blend of the bCOC and PE has improved strain hardening useful for foaming applications, excellent oxygen transmission rate with improved miscibility and morphology.

Polyethylene

The polyethylene used for embodiments described herein is an ethylene-based copolymer having about 99 wt % to about 60 wt %, about 99 wt % to about 70 wt %, about 99 wt % to about 80 wt %, about 99 wt % to about 85 wt %, about 99 wt % to about 87.5 wt %, about 99 wt % to about 90 wt %, about 99 wt % to about 92.5 wt %, about 99 wt % to about 95 wt %, or about 99 wt % to about 97 wt %, of polymer units derived from ethylene. Such polymers may have about 0.1 wt % to about 40 wt %, about 1 wt % to about 30 wt %, about 1 wt % to about 20 wt %, about 1 wt % to about 15 wt %, about 1 wt % to about 12.5 wt %, about 1 wt % to about 10 wt %, about 1 wt % to about 7.5 wt %, about 1 wt % to about 5 wt %, or about 1 wt % to about 6 wt % of polymer units derived from one or more $C_3$ to $C_{20}$ α-olefin comonomers, such as $C_3$ to $C_{10}$ α-olefins, and such as $C_3$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, 1-ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include propylene, 1-butene, 1-hexene, and 1-octene, 1-hexene, and mixtures thereof.

In some embodiments, the polyethylene polymer comprises from about 8 wt % to about 15 wt % (such as about 9 wt % to about 12 wt %) of $C_3$ to $C_{10}$ α-olefin derived units, and from about 92 wt % to about 85 wt % ethylene derived units (such as about 91 wt % to about 88 wt %), based upon the total weight of the polymer.

In some embodiments, the polyethylene polymer has an Mw of from about 40,000 g/mol to about 3,500,000, such as from about 200,000 g/mol to about 3,000,000 g/mol, such as from about 200,000 g/mol to about 2,500,000 g/mol, such as from about 1,000,000 g/mol to about 2,500,000 g/mol, such as from about 2,000,000 g/mol to about 3,000,000 g/mol.

A polyethylene polymer may have a melt index (MI), $I_{2.16}$ or simply $I_2$ for shorthand, according to ASTM D1238, condition E (190° C./2.16 kg) reported in grams per 10 minutes (g/10 min.), of ≥about 0.10 g/10 min., e.g., ≥about 0.15 g/10 min., ≥about 0.18 g/10 min., ≥about 0.20 g/10 min., ≥about 0.22 g/10 min., ≥about 0.25 g/10 min., or ≥about 0.28 g/10 min. Additionally, a polyethylene polymer may have a melt index ($I_{2.16}$) ≤about 2.0 g/10 min., e.g., ≤about 1.5 g/10 min., ≤about 1.0 g/10 min., ≤about 0.75 g/10 min., ≤about 0.50 g/10 min., ≤about 0.30 g/10 min., ≤about 0.25 g/10 min., ≤about 0.22 g/10 min., ≤about 0.20 g/10 min., ≤about 0.18 g/10 min., or ≤about 0.15 g/10 min. Ranges include ranges formed by combinations of any of the above enumerated values, e.g., from about 0.1 g/10 min to about 2.0 g/10 min, about 0.1 g/10 min to about 0.5 g/10 min., about 0.2 g/10 min to about 1.0 g/10 min., about 0.2 g/10 min to about 0.5 g/10 min.

A polyethylene polymer may also have High Load Melt Index (HLMI), $I_{21.6}$ or $I_{21}$ for shorthand, measured in accordance with ASTM D-1238, condition F (190° C./21.6 kg). For a given polymer having an MI and MIR as defined herein, the HLMI is fixed and can be calculated in accordance with the following paragraph.

A polyethylene polymer may have a Melt Index Ratio (MIR) which is a dimensionless number and is the ratio of the high load melt index to the melt index, or $I_{21.6}/I_{2.16}$ as described above. The MIR of a polyethylene polymer may be from about 5 to about 80, from about 10 to about 40, from about 10 to about 25, or from about 12 to about 20.

A polyethylene polymer may have a density ≥about 0.88 g/cm³, about 0.905 g/cm³, ≥about 0.910 g/cm³, ≥about 0.912 g/cm³, ≥about 0.913 g/cm³, ≥about 0.915 g/cm³, ≥about 0.916 g/cm³, ≥about 0.917 g/cm³, ≥about 0.918 g/cm³, or ≥about 0.920 g/cm³. Additionally or alternately, a polyethylene polymer may have a density ≤about 0.99 g/cm³, e.g., ≤about 0.970 g/cm³, ≤about 0.965 g/cm³, ≤about 0.960 g/cm³, ≤about 0.955 g/cm³, ≤about 0.950 g/cm³, or ≤about 0.945 g/cm³. Ranges include ranges formed by combinations of any of the above-enumerated values, e.g., from about 0.88 to about 0.96 g/cm³, about 0.88 g/cm³ to about 0.925 g/cm³, about 0.905 g/cm³ to about 0.99 g/cm³, about 0.910 g/cm³ to about 0.96 g/cm³, about 0.910 to about 0.95 g/cm³, about 0.910 g/cm³ to about 0.94 g/cm³, about 0.910 g/cm³ to about 0.937 g/cm³, about 0.910 g/cm³ to about 0.927 g/cm³, about 0.915 g/cm³ to about 0.927 g/cm³, about 0.914 g/cm³ to about 0.927 g/cm³, about 0.915 g/cm³ to about 0.927 g/cm³. For example, the polyethylene can be a low density polyethylene (LDPE), a linear low density polyethylene (LLDPE), or high density polyethylene (HDPE) having a density within a range from 0.88 g/cm³, or 0.90 g/cm³ to 0.925 g/cm³, or 0.93 g/cm³, or 0.96 g/cm³, and having a melt index (190° C./2.16 kg) within the range from 0.2 to 10 g/10 min.

Density is determined using chips cut from plaques compression molded in accordance with ASTM D-1928 Procedure C, aged in accordance with ASTM D-618 Procedure A, and measured as specified by ASTM D-1505.

In some embodiments, the melt strength of a polyethylene polymer may be from about 1 cN to about 100 cN, about 1 cN to about 50 cN, about 1 cN to about 25 cN, about 3 cN to about 15 cN, about 4 cN to about 12 cN, or about 5 cN to about 10 cN, or about 5 cN to about 15 cN, when measured at 190° C. In some embodiments, the polyethylene polymer has a melt strength of at least about 5 cN, at least about 10 cN, or at least about 15 cN, and 20 up to about 30 cN, when measured at 190° C. The melt strength of a polymer at a particular temperature may be determined with a Gottfert Rheotens Melt Strength Apparatus. To determine the melt strength, a polymer melt strand extruded from the capillary die is gripped between two counter-rotating wheels on the apparatus. The take-up speed is increased at a constant acceleration of 2.4 mm/sec². The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm.

The polyethylene polymer may also be characterized by an averaged 1% secant modulus (M) of from 10,000 psi to 60,000 psi (pounds per square inch), and a relation between M and the dart drop impact strength in g/mil (1 mil=25.4 micron) (DIS) complying with formula (A):

$$DIS > 0.8*[100 + e^{(1171 - 0.000268M + 2183 \times 10^{-9}M^2)}] \quad (A)$$

where "e" represents 2.7183, the base Napierian logarithm, M is the averaged modulus in psi, and DIS is the 26 inch dart impact strength. The DIS can be from about 120 to about 1000 g/mil, such as from about 150 to about 800 g/mil.

The relationship of the Dart Impact Strength to the averaged 1% secant modulus is thought to be one indicator of long-chain branching in the ethylene-based polymer. Thus, ethylene-based polymers of certain embodiments may be characterized as having low amounts of long-chain branches. Long-chain branches represent the branches formed by reincorporation of vinyl-terminated macromers, not the branches formed by incorporation of the comonomers. The number of carbon atoms on the long-chain branches ranges from a chain length of at least one carbon more than two carbons less than the total number of carbons in the comonomer to several thousands. For example, a long-chain branch of an ethylene/hexene ethylene-based polymer is at least five (5) carbons in length (i.e., 6 carbons less 2 equals 4 carbons plus one equals a minimum branch length of five carbons for long-chain branches).

Particular ethylene-based polymers have a long-chain branching value of from about 0.05 to about 1 long-chain branches per 1000 carbon atoms, such as about 0.05 to about 0.5, such as about 0.1 to about 0.4, or about 0.2 to about 0.3. Ethylene-based polymers having levels of long-chain branching greater than 1.0 long-chain branch per 1000 carbon atoms may have some beneficial properties, e.g., improved processability, shear thinning, and/or delayed melt fracture, and/or improved melt strength.

Various methods are known for determining the presence of long-chain branches. For example, long-chain branching can be determined using $^{13}C$ nuclear magnetic resonance (NMR) spectroscopy, e.g., for ethylene homopolymers and for certain copolymers, and it can be quantified using the method of Randall (*Journal of Macromolecular Science, Rev. Macromol. Chem. Phys.*, C29 (2&3), p. 285-297).

Although conventional $^{13}C$ NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}C$ resonances of the comonomer overlap completely with the $^{13}C$ resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}C$-labeled ethylene. In this case, the resonances associated with macromer incorporation will be significantly enhanced in intensity and will show coupling to neighboring $^{13}C$ carbons, whereas the octene resonances will be unenhanced.

Alternately, the degree of long-chain branching in ethylene-based polymers may be quantified by determination of the branching index. The branching index g' is defined by the following equation:

$$g' = \frac{IV_{Br}}{IV_{Lin}}\bigg|_{M_w}$$

where g' is the branching index, $IV_{Br}$ is the intrinsic viscosity of the branched ethylene-based polymer and $IV_{Lin}$ is the intrinsic viscosity of the corresponding linear ethylene-based polymer having the same weight average molecular weight and molecular weight distribution as the branched ethylene-based polymer, and in the case of copolymers and terpolymers, substantially the same relative molecular proportion or proportions of monomer units. For purposes of the present disclosure, the molecular weight and molecular weight distribution are considered "the same" if the respective values for the branched polymer and the corresponding linear polymer are within 10% of each other. For example, the molecular weights are the same and the MWD of the polymers are within 10% of each other. Intrinsic viscosity of a polymer may be determined by ASTM D-5225-98— Standard Test Method for Measuring Solution Viscosity of Polymers with a Differential Viscometer, which is incorporated by reference herein in its entirety.

The branching index, g' is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$. Thus, the branching index due to long-chain branching may be calculated from the experimentally determined value for g' as described by Scholte, et al., in *J. App. Polymer Sci.*, 29, pp. 3763-3782 (1984).

In at least one embodiment, a polyethylene may have a g'vis value of from about 0.87 to about 1, such as from about 0.97 to about 1.

In at least one embodiment, a polyethylene comprises ≥50 wt % of polymer units derived from ethylene and ≤50 wt %, such as 1.0 wt % to 35.0 wt %, such as 1 wt % to 6 wt %, of polymer units derived from a $C_3$ to $C_{20}$ alpha-olefin comonomer (such as hexene or octene). A polyethylene can have a composition distribution breadth index (CDBI) of 60.0% or more, such as 60.0% to 80.0%, such as 65.0% to 80.0%. A polyethylene may have a density of 0.910 to 0.950 g/cm³ (such as 0.915 to 0.940 g/cm³, such as 0.918 to 0.925 g/cm³) and a CDBI of 60.0% to 80.0%, such as 65% to 80%.

CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

A polyethylene may have a melt index ($I_{2.16}$) according to ASTM D1238 (190° C./2.16 kg) of 0.5 g/10 min to 5.0 g/10 min, such as 0.8 g/10 min to 1.5 g/10 min. Polymers can be metallocene polyethylenes (mPEs). Such linear polyethylenes typically have a $g'_{vis} \geq 0.97$, such as $\geq 0.98$ and can be a prepared by gas-phase polymerization supported catalyst with a bridged bis(alkyl-substituted dicyclopentadienyl) zirconium dichloride transition metal component and methyl alumoxane cocatalyst. A polyethylene can also be formed by mixed metallocene catalyst systems.

Polyethylene polymers of the present disclosure may be made by any suitable polymerization method including solution polymerization, slurry polymerization, and gas phase polymerization using supported or unsupported catalyst systems, such as a system incorporating a metallocene catalyst.

A polyethylene may be made with one or more metallocene catalyst systems. As used herein, the term "metallocene catalyst" includes at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium. Metallocene catalysts generally include activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (such as methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica. Zirconium transition metal metallocene-type catalyst systems are particularly suitable. Non-limiting examples of metallocene catalysts and catalyst systems include those described in, U.S. Pat. Nos. 5,466,649, 6,476, 171, 6,225,426, and 7,951,873, all of which are fully incorporated herein by reference. Particularly useful catalyst systems include supported dimethylsilyl bis(tetrahydroindenyl) zirconium dichloride. A polyethylene can also be formed by mixed metallocene catalyst systems.

The polyethylene can also be commercially available, such as Exceed™ polyethylenes available from ExxonMobil Chemical Company (Houston, Tex.). Examples include:

Exceed™ Polyethylene 2018 ("Exceed PE 2018"), an mLLDPE available from ExxonMobil Chemical Company (Houston, Tex.), has an MI of 2.0 g/10 min, MIR of 16, and a density of 0.918 g/cm³.

Exceed™ Polyethylene 1018 ("Exceed PE 1018"), is an mLLDPE (metallocene ethylene/hexene copolymer) available from ExxonMobil Chemical Company (Houston, Tex.), having an MI of 1.0 g/10 min, MIR of 16, and a density of 0.918 g/cm³.

Exceed™ 3527 is an mLLDPE (metallocene ethylene/hexene copolymer) available from ExxonMobil Chemical Company (Houston, Tex.), having an MI of 3.5 dg/min, a melting temperature of about 121° C., and a density of 0.927 g/cm$^3$.

Exceed™ 3518 is an ethylene polymer available from ExxonMobil Chemical Company (Houston, Tex.), having a density of 0.918 g/cc and a melt index (190° C.) of 3.5 g/10 min. (ASTM D1238).

Exceed™ 4518 is an LLDPE linear homogenous ethylene-hexene-1 copolymer with a melt index of 4.5 g/10 min. (ASTM D1238) and a density of 0.918 g/cc (ASTM D1505), available from ExxonMobil Chemical Company (Houston, Tex.).

bCOC Compositions with Other Polymers

The bCOCs useful for embodiments described herein (such as compositions, blends, films, and articles, and various end uses) may be any bCOC described herein. The polyethylenes useful for embodiments described herein may be any PE described herein.

In some embodiments, the composition comprises (or consists essentially of) within the range from about 0.2 wt %, or about 0.5 wt %, or about 1 wt % to about 3 wt %, or about 4 wt %, or about 5 wt %, or about 8 wt %, or about 10 wt % of the bCOC and a polyethylene, such as a LLDPE. In any embodiment, when the bCOC described herein is blended with a polyethylene, such as a LLDPE, within the range from about 0.2 wt %, or about 0.5 wt %, or about 1 wt % to about 3 wt %, or about 4 wt %, or about 5 wt %, or about 8 wt %, or about 10 wt %, the blend has a Strain Hardening Ratio (SHR) at 2.5 Hencky strain of greater than about 1.0, or about 1.5, or about 2.0; or within a range from about 1.0, or about 1.5, or about 2.0 to about 10, or about 12, or about 14, or about 16, or about 18.

The bCOC compositions may further comprise "additives" within the range from 0.01 wt % to about 1 wt %, or about 2 wt %, or about 3 wt %, or about 4 wt %, by weight of the bCOC and additives, such additives including one or more fillers, antioxidants (including phenolic compounds, phosphites, and alkyl-radical scavengers such as lactones and tocopherol), anti-cling agents, tackifiers, UV stabilizers, heat stabilizers, anti-blocking agents, release agents, foaming agent, anti-static agents, pigments, colorants, dyes, waxes, silica, talc, or a combination thereof. Specific examples of additives are described in WO 2009/007265. In some embodiments, even when desirable compositions consists of the bCOC, the composition may include up to about 0.5 wt %, by weight of the composition, of one or more antioxidants, one or more foaming agents, or a combination thereof.

A "foaming" or "blowing" agent is a substance which is capable of producing a cellular structure via a process of forming or releasing a gas within a variety of materials (molten, semi-molten, or otherwise) that undergo hardening or phase transition, such as polymers and plastics. Common foaming agents include sodium bicarbonate, carbon dioxide, and azobisformamide but there are many others well known in the art. Such agents may be present to any desirable level, in any embodiment, from about 10 ppm, or about 20 ppm, or about 100 ppm to about 1000 ppm, or about 2000 ppm, up to about 2 wt %, or about 3 wt % or more as is known in the art for foaming agents.

The various descriptive elements and numerical ranges disclosed herein for the bCOCs and methods of forming such can be combined with other descriptive elements and numerical ranges to describe the bCOCs and desirable compositions including such. The various descriptive elements and numerical ranges disclosed herein for the PE and methods of forming such can be combined with other descriptive elements and numerical ranges to describe the PE and desirable compositions including such. Further, for a given element, any upper numerical limit can be combined with any lower numerical limit described herein, including the examples in jurisdictions that allow such combinations. The features of the PE-bCOCs are demonstrated below in the non-limiting examples.

Articles and Uses of the PE-bCOC Compositions

Articles and uses for the PE-bCOC compositions can be in the form of a monolayer film, multilayer film, monolayer sheet, multilayer sheet, and receptacles (e.g., containers, bags, shrink bags, pouches, casings, trays, lidded trays, overwrapped trays, form shrink packages, vacuum skin packages, flow wrap packages, thermoformed packages, packaging inserts, heat seals, or combinations thereof). The receptacles may include rigid, semi-rigid, and flexible materials.

The receptacles may be heat shrinkable, or oriented or non-oriented. Receptacles can be used to contain, receive, and dispense items such as fluent products, organic material (such as food), and gas.

In some embodiments, the present disclosure relates to blend compositions of PE and COC with improved miscibility, morphology, and excellent oxygen barrier properties.

The embodiments described herein can include any bCOC described herein and any PE described herein.

Monolayer, Sealable Film

For example, in some embodiments, the present disclosure relates to a monolayer, sealable film. The monolayer, sealable film includes any polyethylene described herein and any bCOC described herein. For example, the bCOC comprises about 50 wt % to about 98 wt % ethylene derived monomer units; and about 2 wt % to about 50 wt % cyclic olefin derived monomer units. In some embodiments, the PE has a density within a range from about 0.88 g/ml to about 0.96 g/ml (such as within a range from about 0.88 g/ml to about 0.925 g/ml).

In some embodiments, the amount of PE and bCOC includes the amounts described above, such as 0.2 wt % to 10 wt % (such as less than about 5%) of the bCOC.

In some embodiments, the monolayer, sealable film is a gas barrier film having an oxygen transmission rate of less than about 350 cm$^3$/m$^2$/24 hours, such as less than about 320, about 300, about 250, about 200, about 150, about 100, about 75, about 50, about 40, about 30, about 20, about 10, about 5 or about 3 cm$^3$/m$^2$/24 hours measured at 0% relative humidity and 40° C.

In some embodiments, the monolayer, sealable film is free of added oxygen scavenging agents, polyamides, ethyl vinyl alcohol, polyvinylidene chloride, polyester, metallized film, metal-oxides, acrylate modified polymers, or a combination thereof.

Receptacles

In some embodiments, the receptacle is a receptacle for containing food. Alternately, the receptacle is a receptacle for containing gas. Alternately, the receptacle is a receptacle for containing fluent material. In any embodiment, the receptacles may include rigid, semi-rigid, and flexible materials.

In an embodiment and as shown in FIG. 1, the receptacle of the present disclosure has a storage zone 105. A sealing zone 110 (old 4a and 4b) extends around at least a portion of the storage zone 105. A film structure 115 (not shown by current numbers) has an exterior surface 120 (not shown by current numbers) and a storage side surface 125 (not shown by current numbers). The storage side surface 125 of film structure 115 faces the storage zone 105. In some embodiments, the film structure 115 comprises the gas barrier film described herein. In some embodiments, the sealing zone comprises the gas barrier film, and the gas barrier film forms the storage side surface of the film structure (not shown). In some embodiments, the gas barrier film forms a heat seal in the sealing zone (not shown).

In some embodiments, the gas barrier film comprises any polyethylene described herein and any bCOC described herein. For example, the bCOC comprises about 50 wt % to about 98 wt % ethylene derived monomer units; and about 2 wt % to about 50 wt % cyclic olefin derived monomer units. In some embodiments, the PE has a density within a range from about 0.88 g/ml to about 0.96 g/ml (such as within a range from about 0.88 g/ml to about 0.925 g/ml).

In some embodiments, the amount of PE and bCOC includes the amounts described above, such as 0.2 wt % to 10 wt % (such as less than about 5%) of the bCOC.

In some embodiments, the film structure is a monolayer comprising the gas barrier film.

In some embodiments, the gas barrier film has an oxygen transmission rate of less than about 350 $cm^3/m^2/24$ hours, such as less than about 320, about 300, about 250, about 200, about 150, about 100, about 75, about 50, about 40, about 30, about 20, about 10, about 5 or about 3 $cm^3/m^2/24$ hours measured at 0% relative humidity and a temperature of 40° C.

In some embodiments, the gas barrier film is free of added oxygen scavenging agents, polyamides, ethyl vinyl alcohol, polyvinylidene chloride, polyester, metallized film, metal-oxides, acrylate modified polymers, or a combination thereof.

In some embodiments, an organic material (such as food), a gas, a liquid product, a pourable solid product, or a combination thereof are contained in the storage zone.

In some embodiments, the gas barrier film is a food contact structure, a gas contact structure, a fluent material contact structure, or a combination thereof. In some embodiments, the gas barrier film has heat sealing properties. In some embodiments the contact structures may also function as a heat sealing or heat sealable structure to facility formation of sealed packages and plastic casings.

This invention further relates to:

1. A monolayer, sealable film, comprising: polyethylene; and about 0.2 wt % to about 10 wt % of a branched cyclic olefin copolymer (bCOC) comprising: 1) about 50 wt % to about 98 wt % ethylene derived monomer units; and 2) about 2 wt % to about 50 wt % cyclic olefin derived monomer units.
2. The film of paragraph 1, wherein the film comprises less than about 5 wt % of the bCOC.
3. The film of paragraph 1 or 2, wherein the polyethylene has a density within a range from about 0.88 g/ml to about 0.96 g/ml.
4. The film of paragraph 1 or 2, wherein the polyethylene has a density within a range from about 0.88 g/ml to about 0.925 g/ml.
5. The film of any of paragraphs 1-4, wherein the film has an oxygen transmission rate of less than about 350 $ml/m^2/24$ hours measured at 0% relative humidity and 40° C.
6. The film of any of paragraphs 1-4, wherein the film has an oxygen transmission rate of less than about 320 $ml/m^2/24$ hours measured at 0% relative humidity and 40° C.
7. The film of any of paragraphs 1-4, wherein the film has an oxygen transmission rate of less than about 100 $ml/m^2/24$ hours measured at 0% relative humidity and 40° C.
8. The film of any of paragraphs 1-4, wherein the film has an oxygen transmission rate of less than about 75 $ml/m^2/24$ hours measured at 0% relative humidity and 40° C.
9. The film of any of paragraphs 1-8, wherein the film is free of added oxygen scavenging agents, polyamides, ethyl vinyl alcohol, polyvinylidene chloride, polyester, metallized film, metal-oxides, acrylate modified polymers, or a combination thereof.
10. A receptacle for containing organic material, the receptacle comprising: a storage zone; a sealing zone extending around at least a portion of the storage zone; and a film structure having an exterior surface and a storage side surface facing the storage zone, wherein the film structure comprises a gas barrier film, comprising: polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.
11. The receptacle of paragraph 10, wherein the film structure is a monolayer, comprising: the gas barrier film.
12. The receptacle of paragraphs 10 or 11, wherein the sealing zone comprises the gas barrier film, and the gas barrier film forms the storage side surface of the film structure.
13. The receptacle of any of paragraphs 10-12, wherein the sealing zone comprises the gas barrier film, and the gas barrier film forms a heat seal in the sealing zone.
14. The receptacle of any of paragraphs 10-13, wherein the gas barrier film comprises: less than 5 wt % of the bCOC.
15. The receptacle of any of paragraphs 10-14, wherein the polyethylene has a density within a range from about 0.88 g/ml to about 0.96 g/ml.
16. The receptacle of paragraphs 10-14, wherein the polyethylene has a density within a range from about 0.88 g/ml to about 0.925 g/ml.
17. The receptacle of any of paragraphs 10-16, wherein the gas barrier film has an oxygen transmission rate of less than about 350 $ml/m^2/24$ hours measured at 0% relative humidity and 40° C.
18. The receptacle of any of paragraphs 10-16, wherein the gas barrier film has an oxygen transmission rate of less than about 320 $ml/m^2/24$ hours measured at 0% relative humidity and 40° C.
19. The receptacle of any of paragraphs 10-16, wherein the gas barrier film has an oxygen transmission rate of less than about 100 $ml/m^2/24$ hours measured at 0% relative humidity and 40° C.
20. The receptacle of any of paragraphs 10-16, wherein the gas barrier film has an oxygen transmission rate of less than about 75 $ml/m^2/24$ hours measured at 0% relative humidity and 40° C.
21. The receptacle of any of paragraphs 10-20, wherein the gas barrier film is free of added oxygen scavenging agents, polyamides, ethyl vinyl alcohol, polyvinylidene chloride, polyester, metallized film, metal-oxides, acrylate modified polymers, or a combination thereof.
22. The receptacle of any of paragraphs 10-21, further comprising: organic material disposed within the storage zone.
23. A receptacle for containing gas, the receptacle comprising: a storage zone; a sealing zone extending around at least a portion of the storage zone; and a film structure having an exterior surface and a storage side surface facing the storage zone, wherein the film structure comprises a gas barrier film, comprising: polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.

24. The receptacle of paragraph 23, wherein the film structure is a monolayer, comprising: the gas barrier film.

25. The receptacle of paragraphs 23 or 24, wherein the sealing zone comprises the gas barrier film, and the gas barrier film forms the storage side surface of the film structure.

26. The receptacle of any of paragraphs 23-25, wherein the sealing zone comprises the gas barrier film, and the gas barrier film forms a heat seal in the sealing zone.

27. The receptacle of any of paragraphs 23-26, wherein the gas barrier film comprises: less than about 5 wt % of the bCOC.

28. The receptacle of any of paragraphs 23-27, wherein the polyethylene has a density within a range from about 0.88 g/ml to about 0.96 g/ml.

29. The receptacle of paragraphs 1 or 2, wherein the polyethylene has a density within a range from about 0.88 g/ml to about 0.925 g/ml.

30. The receptacle of any of paragraphs 23-29, wherein the gas barrier film has an oxygen transmission rate of less than about 350 ml/m$^2$/24 hours measured at 0% relative humidity and 40° C.

31. The receptacle of any of paragraphs 23-29, wherein the gas barrier film has an oxygen transmission rate of less than about 320 ml/m$^2$/24 hours measured at 0% relative humidity and 40° C.

32. The receptacle of any of paragraphs 23-29, wherein the gas barrier film has an oxygen transmission rate of less than about 100 ml/m$^2$/24 hours measured at 0% relative humidity and 40° C.

33. The receptacle of any of paragraphs 23-29, wherein the gas barrier film has an oxygen transmission rate of less than about 75 ml/m$^2$/24 hours measured at 0% relative humidity and 40° C.

34. The receptacle of any of paragraphs 23-33, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

35. The receptacle of any of paragraphs 23-34, further comprising: gas contained in the storage zone.

36. A receptacle for containing a fluent material, comprising: a storage zone; a sealing zone extending around at least a portion of the storage zone; and a film structure having an exterior surface and a storage side surface facing the storage zone, wherein the film structure comprises a gas barrier film, comprising: polyethylene; and about 0.2 wt % to about 10 wt % of a branched cyclic olefin copolymer (bCOC) comprising: about 50 wt % to about 98 wt % ethylene derived monomer units; and about 2 wt % to about 50 wt % cyclic olefin derived monomer units.

37. The receptacle of paragraph 34, wherein the film structure is a monolayer, comprising: the gas barrier film.

38. The receptacle of paragraphs 36 or 37, wherein the sealing zone comprises the gas barrier film, and the gas barrier film forms the storage side surface of the film structure.

39. The receptacle of any of paragraphs 36-38, wherein the sealing zone comprises the gas barrier film, and the gas barrier film forms a heat seal in the sealing zone.

40. The receptacle of any of paragraphs 36-39, wherein the gas barrier film comprises less than about 5 wt % of the bCOC.

41. The receptacle of any of paragraphs 36-40, wherein the polyethylene has a density within a range from about 0.88 g/ml to about 0.96 g/ml.

42. The receptacle of paragraphs 36-41, wherein the polyethylene has a density within a range from about 0.88 g/ml to about 0.925 g/ml.

43. The receptacle of any of paragraphs 36-42, wherein the gas barrier film has an oxygen transmission rate of less than about 350 ml/m$^2$/24 hours measured at 0% relative humidity and 40° C.

44. The receptacle of any of paragraphs 36-42, wherein the gas barrier film has an oxygen transmission rate of less than about 320 ml/m$^2$/24 hours measured at 0% relative humidity and 40° C.

45. The receptacle of any of paragraphs 36-42, wherein the gas barrier film has an oxygen transmission rate of less than about 100 ml/m$^2$/24 hours measured at 0% relative humidity and 40° C.

46. The receptacle of any of paragraphs 36-42, wherein the gas barrier film has an oxygen transmission rate of less than about 75 ml/m$^2$/24 hours measured at 0% relative humidity and 40° C.

47. The receptacle of any of paragraphs 36-46, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

48. The receptacle of any of paragraphs 36-47, further comprising: a liquid product, a pourable solid product, or a combination thereof contained in the storage zone.

This invention further relates to:

1A. A film (preferably a monolayer, sealable film), comprising: polyethylene; and about 0.2 wt % to about 10 wt % of a branched cyclic olefin copolymer (bCOC) comprising: 1) about 50 wt % to about 98 wt % ethylene derived monomer units; and 2) about 2 wt % to about 50 wt % cyclic olefin derived monomer units.

2A. The film of paragraph 1A, wherein the film comprises less than about 5 wt % of the bCOC.

3A. The film of paragraph 1 or 2, wherein the polyethylene has a density within a range from about 0.88 g/ml to about 0.96 g/ml, preferably from about 0.88 g/ml to about 0.925 g/ml.

4A. The film of any of paragraphs 1-3, wherein the film has an oxygen transmission rate, measured at 0% relative humidity and 40° C., of less than about 350 ml/m$^2$/24 hours, alternately less than about 320 ml/m$^2$/24 hours, alternately less than about 100 ml/m$^2$/24 hours, alternately less than about 75 ml/m$^2$/24 hours.

5A. The film of any of paragraphs 1-4, wherein the film is free of added oxygen scavenging agents, polyamides, ethyl vinyl alcohol, polyvinylidene chloride, polyester, metallized film, metal-oxides, acrylate modified polymers, or a combination thereof.

6A. A receptacle for containing organic material, the receptacle comprising: a storage zone; a sealing zone extending around at least a portion of the storage zone; and a film structure having an exterior surface and a storage side surface facing the storage zone, wherein the film structure comprises a gas barrier film (preferably a mono-layer), comprising the film of any of paragraphs 1A to 5A.

7A. The receptacle of paragraph 6A, wherein the sealing zone comprises the gas barrier film, and the gas barrier film forms the storage side surface of the film structure.

8A. The receptacle of paragraph 6A or 7A, wherein the sealing zone comprises the gas barrier film, and the gas barrier film forms a heat seal in the sealing zone.

9A. The receptacle of any of paragraphs 6A to 8A, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

10A. The receptacle of any of paragraphs 6A to 9A, further comprising: organic material disposed within the storage zone.

11A. A receptacle for containing gas, the receptacle comprising: a storage zone; a sealing zone extending around at least a portion of the storage zone; and a film structure having an exterior surface and a storage side surface facing the storage zone, wherein the film structure comprises a gas barrier film (preferably a monolayer), comprising the film of any of paragraphs 1A to 5A.

12A. The receptacle of paragraph 11A, wherein the sealing zone comprises the gas barrier film, and the gas barrier film forms the storage side surface of the film structure.

13A. The receptacle of paragraph 11A or 12A, wherein the sealing zone comprises the gas barrier film, and the gas barrier film forms a heat seal in the sealing zone.

14A. The receptacle of any of paragraphs 11A to 13A, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

15A. The receptacle of any of paragraphs 11A to 14A, further comprising: gas contained in the storage zone.

16A. A receptacle for containing a fluent material, comprising: a storage zone; a sealing zone extending around at least a portion of the storage zone; and a film structure having an exterior surface and a storage side surface facing the storage zone, wherein the film structure comprises a gas barrier film (preferably a monolayer), comprising the film of any of paragraphs 1A to 5A.

17A. The receptacle of paragraph 16A, wherein the sealing zone comprises the gas barrier film, and the gas barrier film forms the storage side surface of the film structure.

18A. The receptacle of paragraph 16A or 17A, wherein the sealing zone comprises the gas barrier film, and the gas barrier film forms a heat seal in the sealing zone.

19A. The receptacle of any of paragraphs 16A to 18A, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

20A. The receptacle of any of paragraphs 16A to 19 A, further comprising: a liquid product, a pourable solid product, or a combination thereof contained in the storage zone.

EXPERIMENTAL

Test Methods
Oxygen Barrier Properties

Sample specimens were compression molded. Oxygen barrier properties were measured on a Mocon OX-TRAN 2/61 using standard conditions at 0% relative humidity and 40° C. Each sample was tested three times with Nitrogen gas to establish a baseline (individual zero) and three times with oxygen and the final reading is the result.

Differential Scanning Calorimetry (DSC) Procedure

The degree of crystallinity of a polyolefin is determined by dividing its heat of fusion measured by DSC with the heat of fusion for 100% crystalline polyethylene which has the value of 293 J/g (B. Wunderlich, THERMAL ANALYSIS 417-431 (Academic Press, 1990)). The DSC procedure may be used to determine crystallinity, the glass transition temperature ($T_g$), and the melting point temperature ($T_m$) of the bCOC. Approximately 6 mg of material is placed in microliter aluminum sample pan. The sample is placed in a differential scanning calorimeter (Perkin Elmer or TA Instrument Thermal Analysis System) and is heated from ambient to 210° C. at 10° C./minute and held at 210° C. for 5 minutes. Afterward, the sample is cooled down to −90° C. at 10° C./minute. The sample is held at −90° C. for 5 minutes and then heated from −90° C. to 210° C. at 10° C./minute for a second heating cycle. The $T_g$ and $T_m$ were determined after the second heating cycle, but the samples are not otherwise annealed. Melting temperature $T_m$, $T_g$, and heat of fusion were determined in the TA Universal Analysis on the second heating cycle. The Glass Transition menu item on the TA Universal Analysis equipment is used to calculate the onset, end, inflection, and signal change of $T_g$ in the DSC. The program enables the determination of the onset, which is the intersection of the first and second tangents, where the inflection is the portion of the curve between the first and third tangents with the steepest slope, and the end is the intersection of the second and third tangents.

Strain Hardening

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL. 585-606 (2005). Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity versus time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. In addition to the extensional test, samples are also tested using transient steady shear conditions and matched to the extensional data using a correlation factor of three. This provides the linear viscoelastic envelope (LVE). Rectangular sample specimens with dimensions approximately 18.0 mm long× 12.70 mm wide are mounted on the SER fixture. Samples are generally tested at three Hencky strain rates: $0.01\ s^{-1}$, $0.1\ s^{-1}$, and $1\ s^{-1}$. The testing temperature is 150° C. The polymer samples were prepared as follows: the sample specimens were hot pressed at 190° C., mounted to the fixture, and equilibrated at 150° C.

Hysteresis and Permanent Set

The Rheometrics Solids Analyzer (RSA3) as used for the hysteresis measurements, and the permanent set was calculated from that under AS TM D4 1 2. The RSA3 imposes a tensile elongation on a polymer sample to determine the tensile strength of a sample. The hysteresis measurement gauges the stress on a sample as the rheometer imposes a specified elongation and immediate retraction of the polymer sample. The hysteresis of the sample under stress is done under elongation over two full cycles. The elongation measurement stretches a sample at a constant elongation rate (typically 0.333 mm/sec) until the sample breaks. The resulting stress under this deformation is measured and the stress at fracture determines the yield stress.

Samples were prepared as small dumb-bell shaped samples, the whole sample approximately 25.0 mm long by 13 mm wide by 0.5 mm thick polymer samples (wherein the dumb-bell is 2 mm wide by 5 mm long, connecting the two large ends that are 13 mm wide and 9 mm long). Samples were molded at approximately 190° C. on either a Carver Lab Press or Wabash Press. If no stabilizer or antioxidant is already present in the polymer sample, about 0.1 wt % of butylated hydroxytoluene (BHT) is added to the sample.

The polymer samples were loaded into the open oven of the RSA3 between tool clamps on both ends. The length of sample was recorded once sample was stabilized at the testing temperature. After the oven and sample has reached testing temperature of 25° C., the test was begun.

Calibration and quality control for the RSA3 measurements are conducted by performing a dynamic temperature ramp at 6.28 rad/s (1 Hz) from −100° C. to 40° C. at 0.05% strain on a standard sample of ExxonMobil Exact™ 4049 plastomer. The temperature corresponding to the local maximum of the tan delta curve is −40.5° C., and the tan delta is 0.3478.

Permanent set is a standard calculation under ASTM D412 in which a polymer sample of known length is stretched by a stated percentage for a period of time and is then released. After recovery the length is measured and the change in length (i.e., unrecovered length) is expressed as a Percentage of the original length.

Branching

The Mn, Mw, and Mz, was calculated based on GPC-3D (MALLS) analysis. Size-Exclusion Chromatography ("SEC", also known as Gel Permeation Chromatography or "GPC") was carried out using a High Temperature Size Exclusion Chromatograph (either from Waters Corporation or Polymer Laboratories), with a differential refractive index detector (DRI), an online light scattering detector, and a viscometer (SEC-DRI-LS-VIS), and also a MultiAngle Light Scattering detector ("MALLS"), where monodispersed polystyrene is the standard in all cases. The Mark-Houwink constants used were K=0.00070955, and a=0.65397, analyzed as EPDM with 0 wt % propylene. Three Polymer Laboratories PLgel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 m glass pre-filter and subsequently through a 0.1 m Teflon filter. The TCB is then degassed with an online degasser before entering the SEC. In the studies below, the Topas™ E-140 copolymer used as a comparative example was soluble in TCB (the GPC solvent) and generated good signals for analysis. The inventive bCOC was insoluble in TCB so unable to quantify in GPC directly. The existence of branching in the inventive bCOC is based on its behavior compared to other known branched polyolefins tested by the methods described herein.

EXAMPLES

Synthesis of bCOC bCOC may be prepared according to the following non-limiting example. In a dry box, under nitrogen, 11 mg of the catalyst precursor p-triethylsilylphenylcarbyl bis(cyclopentadienyl) (2,7-di-t-butylfluorenyl) hafnium dimethyl was dissolved in 10 ml of dried toluene. Afterwards, 17 mg of dimethyl anilinium tetrakis(perfluorophenyl)borate activator was added, and 4 mg of the solution (1 ml=1 mg) was syringed into a catalyst charger. The charger was removed from the glove box along with a syringe of 0.3 ml tri-isobutylaluminum (TIBAL) 1M in hexanes. At the same time, 10 ml of purified norbornene solution (filtered over neutral alumina, dried over 3A molecular sieves and sodium potassium alloy for 24 hours) was placed in a syringe. The catalyst charger was attached to a prepared 1 liter Zipper Autoclave reactor (nitrogen purged 1 hour, 100° C. bake out and then cooled to 25° C.). TIBAL (0.3 ml) was syringed into the reactor with a low nitrogen purge on the reactor (0 to 2 psi). Then, norbornene (10 ml) was syringed into the reactor. Hexanes (600 ml) were added to the reactor and the stirrer was set at 800 rpm. The temperature was increased to 80° C. set point. Ethylene (200 psi) was introduced to the reactor through a flowmeter. Once the temperature and flow had equilibrated, the catalyst was introduced to the reactor with high pressure nitrogen at 20 lbs above the set pressure of the reactor (set at 250 psi). The flowmeter measured the flow of ethylene as the reaction continued for 46 minutes. After that time the reaction was stopped and cooled to 23° C. The pressure was vented, the reactor was opened and the product (7.33 g) was recovered. The product was characterized by NMR. The norbornene content in the copolymer was calculated to be 5 mol % from the $^{13}$C NMR spectrum.

PE-COC Compositions

An example blend (Blend 3) was compared to comparative Blend 1 and comparative Blend 2. Blend 3 is a blend of the long-chain-branched LCB semi-crystalline COC (an example bCOC as described herein) and Exceed™ 1018 linear low density polyethylene (ExxonMobil Chemical Company). Blend 1 is a blend of an amorphous COC (Topas™ 5013 ethylene-norbornene copolymer, comprising about 75 wt % norbornene) and Exceed™ 1018. Blend 2 is a blend of a linear semi-crystalline COC (Topas E-140) with Exceed™ 1018. The blends had loadings of about 97 wt % LLDPE and about 3 wt % COC.

The blends may be made according to the following non-limiting procedure. Stabilizer package (0.02 g, 50% Irganox 1076 and 50% Irgafos 168) was dissolved in ortho-dichlorobenzene (o-DCB, 200 ml) in a 500 mL round bottom flask, under nitrogen, equipped with a condenser at 120° C. Afterwards, Exceed 1018 LLDPE (19.4 g) and 0.6 g COC (TOPAS 5013, TOPAS E-140, or LCB-COC) were dissolved in the o-DCB. After complete dissolution, the mixture was refluxed for about 1 hour. The mixture was then precipitated with about methanol (2 liters) when it was still warm. The precipitated polymer blend was filtered, washed with fresh methanol, and dried in a vacuum oven until the blend was a constant weight.

TABLE 1

PE-COC Blends

|  | LLDPE (wt %) | COC type (wt %) |
|---|---|---|
| Blend 1 (Comparative 1) | 97 | Topas 5013, 3 |
| Blend 2 (Comparative 2) | 97 | Topas E-140, 3 |
| Blend 3 (Example) | 97 | LCB-COC, 3 |

Oxygen Barrier Properties

Typically, the sorption and diffusion of oxygen gas molecules occurs exclusively in the amorphous domains of the semi-crystalline polymer but not in the crystalline domains. LCB-COC (bCOC) is a semi-crystalline COC, Topas E-140 is a semi-crystalline COC, and Topas 5013 is amorphous. The crystalline domains and orientated crystalline lamellae increase the effective path length of gas molecules' diffusion. Moreover, if the component polymers can co-crystallize, the polymer chain mobility in the amorphous domains can be reduced. This is demonstrated by the oxygen permeability results summarized in Table 2.

Oxygen transmission rates were determined by preparing Mocon samples of each Comparative and Example Blend along with certain reference samples. Mocon specimens were made by compression molding of the polymers at 120-150° C. The polymers were kept in the compression molder at molten state for about 1 min before they were completely pressed for 3-5 minutes. Then the Mocon pads (test samples) were punched out. Thickness measurements were taken and recorded for each sample and they were run in duplicate along with a control sample using a MOCON OX-TRAN 2/61, which determined and reported a transmission rate for each sample.

As shown in Table 2, although the individual components (LLDPE, TOPAS 5013, E-140) have relatively low oxygen permeability, the two comparative blends, Blends 1 and 2, showed much increased oxygen permeability. The example Blend 3 retained the excellent low oxygen permeability due to the morphology and miscibility of the PE-bCOC.

TABLE 2

Oxygen Barrier Properties

|  | Oxygen Transmission Rate (ml/m$^2$/24 hours)[‡] |
|---|---|
| Exceed 1018 | 65 |
| TOPAS 5013 | 81 |
| TOPAS E-140 | 113 |
| Blend 1 (Comparative 1) | 339 |
| Blend 2 (Comparative 2) | 312 |
| Blend 3 (Example) | 72 |

[‡]Data are given as approximate values.

Blend Morphology by Atomic Force Microscopy (AFM)

The compression molded specimens were cryo-microtomed prior to AFM scanning in order to create a smooth surface at −120° C. After microtoming the samples were purged under $N_2$ gas in a desiccator before AFM evaluation. All samples were scanned on the bulk area.

For the comparative Blend 1 and Blend 2, the COC polymers aggregated and formed large isolated domains (black irregular shapes with 0.1~0.3 μm) indicating poor miscibility with LLDPE and contributing to worse barrier properties. Such large isolated domains scatter light and give an opaque appearance. In the example Blend 3, the morphology resembles the neat LLDPE, indicating better miscibility with retained barrier properties.

The blend compositions of PE and COC have improved miscibility and morphology, and excellent oxygen barrier properties. The results show that an additional layer/film that includes oxygen scavenging agents, polyamides, ethyl vinyl alcohol, polyvinylidene chloride, polyester, metallized film, metal-oxides, acrylate modified polymers, or a combination thereof, are not necessary to achieve desired oxygen barrier properties. Moreover, the results demonstrate that a blend composition of PE and bCOC (e.g., film or monolayer) can be free of oxygen scavenging agents, polyamides, ethyl vinyl alcohol, polyvinylidene chloride, polyester, metallized film, metal-oxides, acrylate modified polymers, or a combination thereof, but retain desired oxygen barrier properties. As such, the blend compositions described herein are useful in articles and end uses such as receptacles for organic material (such as food), gas, and fluent materials, as well as monolayer, sealable films.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

We claim:

1. A monolayer, sealable film, comprising:
 polyethylene; and
 about 0.2 wt % to about 10 wt % of a branched cyclic olefin copolymer, bCOC, comprising:
 about 50 wt % to about 98 wt % ethylene derived monomer units; and
 about 2 wt % and about 50 wt % cyclic olefin derived monomer units.

2. The film of claim 1, wherein the film comprises: less than about 5 wt % of the bCOC.

3. The film of claim 1, wherein the polyethylene has a density within a range from about 0.88 g/ml to about 0.96 g/ml.

4. The film of claim 1, wherein the polyethylene has a density within a range from about 0.88 g/ml to about 0.925 g/ml.

5. The film of claim 1, wherein the film has an oxygen transmission rate of less than about 350 ml/m$^2$/24 hours measured at 0% relative humidity and 40° C.

6. The film of claim 1, wherein the film has an oxygen transmission rate of less than about 320 ml/m$^2$/24 hours measured at 0% relative humidity and 40° C.

7. The film of claim 1, wherein the film has an oxygen transmission rate of less than about 100 ml/m$^2$/24 hours measured at 0% relative humidity and 40° C.

8. The film of claim 1, wherein the film has an oxygen transmission rate of less than about 75 ml/m$^2$/24 hours measured at 0% relative humidity and 40° C.

9. The film of claim 1, wherein the film is free of added oxygen scavenging agents, polyamides, ethyl vinyl alcohol, polyvinylidene chloride, polyester, metallized film, metal-oxides, acrylate modified polymers, or a combination thereof.

10. A receptacle for containing organic material, the receptacle comprising:
a storage zone;
a sealing zone extending around at least a portion of the storage zone; and
a film structure having an exterior surface and a storage side surface facing the storage zone, wherein the film structure comprises a gas barrier film, comprising:
polyethylene; and
about 0.2 wt % to about 10 wt % of a branched cyclic olefin copolymer, bCOC, comprising:
about 50 wt % to about 98 wt % ethylene derived monomer units; and
about 2 wt % to about 50 wt % cyclic olefin derived monomer units.

11. The receptacle of claim 10, wherein the film structure is a monolayer, comprising:
the gas barrier film.

12. The receptacle of claim 10, wherein the sealing zone comprises the gas barrier film, and the gas barrier film forms the storage side surface of the film structure.

13. The receptacle of claim 10, wherein the sealing zone comprises the gas barrier film, and the gas barrier film forms a heat seal in the sealing zone.

14. The receptacle of claim 10, wherein the gas barrier film comprises:
less than 5 wt % of the bCOC.

15. The receptacle of claim 10, wherein the polyethylene has a density within a range from about 0.88 g/ml to about 0.96 g/ml.

16. The receptacle of claim 10, wherein the polyethylene has a density within a range from about 0.88 g/ml to about 0.925 g/ml.

17. The receptacle of claim 10, wherein the gas barrier film has an oxygen transmission rate of less than about 350 ml/m$^2$/24 hours measured at 0% relative humidity and 40° C.

18. The receptacle of claim 10, wherein the gas barrier film has an oxygen transmission rate of less than about 320 ml/m$^2$/24 hours measured at 0% relative humidity and 40° C.

19. The receptacle of claim 10, wherein the gas barrier film has an oxygen transmission rate of less than about 100 ml/m$^2$/24 hours measured at 0% relative humidity and 40° C.

20. The receptacle of claim 10, wherein the gas barrier film has an oxygen transmission rate of less than about 75 ml/m$^2$/24 hours measured at 0% relative humidity and 40° C.

21. The receptacle of claim 10, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

22. The receptacle of claim 10, further comprising:
organic material disposed within the storage zone.

23. A receptacle for containing gas, the receptacle comprising:
a storage zone;
a sealing zone extending around at least a portion of the storage zone; and
a film structure having an exterior surface and a storage side surface facing the storage zone, wherein the film structure comprises a gas barrier film, comprising:
polyethylene; and
about 0.2 wt % to about 10 wt % of a branched cyclic olefin copolymer, bCOC, comprising:
about 50 wt % to about 98 wt % ethylene derived monomer units; and
about 2 wt % to about 50 wt % cyclic olefin derived monomer units.

24. The receptacle of claim 23, wherein the film structure is a monolayer, comprising:
the gas barrier film.

25. The receptacle of claim 23, wherein the sealing zone comprises the gas barrier film, and the gas barrier film forms the storage side surface of the film structure.

26. The receptacle of claim 23, wherein the sealing zone comprises the gas barrier film, and the gas barrier film forms a heat seal in the sealing zone.

27. The receptacle of claim 23, wherein the gas barrier film comprises:
less than about 5 wt % of the bCOC.

28. The receptacle of claim 23, wherein the polyethylene has a density within a range from about 0.88 g/ml to about 0.96 g/ml.

29. The receptacle of claim 23, wherein the polyethylene has a density within a range from about 0.88 g/ml to about 0.925 g/ml.

30. The receptacle of claim 23, wherein the gas barrier film has an oxygen transmission rate of less than about 350 ml/m$^2$/24 hours measured at 0% relative humidity and 40° C.

31. The receptacle of claim 23, wherein the gas barrier film has an oxygen transmission rate of less than about 320 ml/m$^2$/24 hours measured at 0% relative humidity and 40° C.

32. The receptacle of claim 23, wherein the gas barrier film has an oxygen transmission rate of less than about 100 ml/m$^2$/24 hours measured at 0% relative humidity and 40° C.

33. The receptacle of claim 23, wherein the gas barrier film has an oxygen transmission rate of less than about 75 ml/m$^2$/24 hours measured at 0% relative humidity and 40° C.

34. The receptacle of claim 23, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

35. The receptacle of claim 23, further comprising:
gas contained in the storage zone.

36. A receptacle for containing a fluent material, comprising:
a storage zone;
a sealing zone extending around at least a portion of the storage zone; and
a film structure having an exterior surface and a storage side surface facing the storage zone, wherein the film structure comprises a gas barrier film, comprising:
polyethylene; and
about 0.2 wt % to about 10 wt % of a branched cyclic olefin copolymer, bCOC, comprising:
about 50 wt % to about 98 wt % ethylene derived monomer units; and
about 2 wt % to about 50 wt % cyclic olefin derived monomer units.

37. The receptacle of claim 36, wherein the film structure is a monolayer, comprising:
    the gas barrier film.

38. The receptacle of claim 36, wherein the sealing zone comprises the gas barrier film, and the gas barrier film forms the storage side surface of the film structure.

39. The receptacle of claim 36, wherein the sealing zone comprises the gas barrier film, and the gas barrier film forms a heat seal in the sealing zone.

40. The receptacle of claim 36, wherein the gas barrier film comprises less than about 5 wt % of the bCOC.

41. The receptacle of claim 36, wherein the polyethylene has a density within a range from about 0.88 g/ml to about 0.96 g/ml.

42. The receptacle of claim 36, wherein the polyethylene has a density within a range from about 0.88 g/ml to about 0.925 g/ml.

43. The receptacle of claim 36, wherein the gas barrier film has an oxygen transmission rate of less than about 350 ml/m$^2$/24 hours measured at 0% relative humidity and 40° C.

44. The receptacle of claim 36, wherein the gas barrier film has an oxygen transmission rate of less than about 320 ml/m$^2$/24 hours measured at 0% relative humidity and 40° C.

45. The receptacle of claim 36, wherein the gas barrier film has an oxygen transmission rate of less than about 100 ml/m2/24 hours measured at 0% relative humidity and 40° C.

46. The receptacle of claim 36, wherein the gas barrier film has an oxygen transmission rate of less than about 75 ml/m$^2$/24 hours measured at 0% relative humidity and 40° C.

47. The receptacle of claim 36, wherein the gas barrier film is free of added oxygen scavenging agents, polyamides, ethyl vinyl alcohol, polyvinylidene chloride, polyester, metallized film, metal-oxides, acrylate modified polymers, or a combination thereof.

48. The receptacle of claim 36, further comprising:
    a liquid product, a pourable solid product, or a combination thereof contained in the storage zone.

* * * * *